United States Patent
Notargiacomo et al.

(10) Patent No.: US 12,382,339 B2
(45) Date of Patent: Aug. 5, 2025

(54) DISTRIBUTED RADIO SYSTEM FOR COMBINING LEGACY ANALOG BASE STATION SIGNALS WITH PACKETIZED MID-HAUL SIGNALS OF MULTIPLE OPERATORS AND PRIVATE NETWORKS

(71) Applicant: John Mezzalingua Associates, LLC, Liverpool, NY (US)

(72) Inventors: Massimo Notargiacomo, Castel Bolognese (IT); Fabrizio Marchese, Castel S. Pietro Terme (IT); Giovanni Chiurco, Castenaso (IT); Giulio Gabelli, Bologna (IT)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 415 days.

(21) Appl. No.: 18/081,462

(22) Filed: Dec. 14, 2022

(65) Prior Publication Data
US 2023/0189067 A1    Jun. 15, 2023

Related U.S. Application Data

(60) Provisional application No. 63/289,354, filed on Dec. 14, 2021.

(51) Int. Cl.
*H04W 28/06*    (2009.01)
*H04B 7/0413*   (2017.01)
*H04W 24/02*    (2009.01)

(52) U.S. Cl.
CPC .......... *H04W 28/06* (2013.01); *H04B 7/0413* (2013.01); *H04W 24/02* (2013.01)

(58) Field of Classification Search
CPC ..... H04W 28/06; H04W 24/02; H04B 7/0413
See application file for complete search history.

(56) References Cited

U.S. PATENT DOCUMENTS

| | | |
|---|---|---|
| 2018/0249375 A1 | 8/2018 | Goldhamer |
| 2020/0235788 A1 * | 7/2020 | Rajagopal ............ H04B 7/0848 |
| 2020/0267596 A1 | 8/2020 | Sudarsan et al. |
| 2021/0029562 A1 * | 1/2021 | Notargiacomo ...... H04W 12/06 |
| 2021/0058140 A1 * | 2/2021 | Schwab ............... H04B 7/0413 |
| 2021/0184723 A1 * | 6/2021 | Brighenti ............. H04B 7/0413 |
| 2021/0409977 A1 * | 12/2021 | Dussmann .............. H04L 45/66 |
| 2023/0026248 A1 * | 1/2023 | Ravuri .................. H04W 40/02 |
| 2025/0097732 A1 * | 3/2025 | Hegde ................... H04W 16/10 |

FOREIGN PATENT DOCUMENTS

EP    3 701 740 B1    6/2021

* cited by examiner

*Primary Examiner* — Abdullahi Ahmed
(74) *Attorney, Agent, or Firm* — BRYAN CAVE LEIGHTON PAISNER LLP (57) ABSTRACT

A distributed radio system has one or more distributed radio processors that processes analog RF signals from a plurality of legacy base station transceivers (BTSs) as well as packetized digital mid-haul data (such as 7.2x data packets) from one or more baseband units. The system digitizes the RF signals and provides baseband frequency offsets to the I/Q time domain data processed from the digital mid-haul data such that each incoming signal is assigned a unique carrier baseband frequency offset so that none of the signals interferes with another. The digital signals are summed and transmitted to one or more remote units. For the uplink, the process is reversed. A supervisor module provides the offset frequencies to the relevant digital baseband signals.

27 Claims, 3 Drawing Sheets

DISTRIBUTED RADIO SYSTEM FOR COMBINING LEGACY ANALOG BASE STATION SIGNALS WITH PACKETIZED MID-HAUL SIGNALS OF MULTIPLE OPERATORS AND PRIVATE NETWORKS

This application claims the benefit of U.S. Provisional Application No. 63/289,354 Dec. 14, 2021, the contents of which are all hereby incorporated by reference herein in their entirety.

BACKGROUND OF THE DISCLOSURE

Field of the Invention

The present invention relates to wireless communications, and more particularly, systems and methods for providing RAN (Radio Access Network) that can serve multiple legacy analog RF (Radio Frequency) base stations as well as baseband processors using packetized mid-haul.

Related Art

A convergence of forces has put considerable pressure on the capabilities of RAN systems, including DAS (Distributed Antenna Systems). One factor is the advent of 5G and its stringent low latency requirements. Another is the coming adoption of O-RAN and its 7.2× split packetized mid-haul. And another is the emergence of shared spectrum access systems such as CBRS (Citizens Broadband Radio Service) and its adoption by incumbent mobile network operators as well as emerging private networks. The convergence of these factors provides challenges and opportunities for RAN providers, such as neutral hosts. In addition to this, RAN providers may also need to accommodate legacy cellular communications technologies, such as 3G.

Accordingly, there is a need for a RAN and/or DAS that can accommodate multiple network operators and private networks, each potentially operating different cellular technologies (from 3G to O-RAN implementations of LTE or 5G), while conforming to strict 5G latency requirements.

SUMMARY OF THE DISCLOSURE

An aspect of the present invention involves a method for processing downlink signals from a plurality of base stations sharing a frequency band. The method comprises receiving one or more analog Radio Frequency (RF) signals, each from a corresponding one or more legacy base station transceivers; receiving one or more packetized data streams, each packetized data stream corresponding to a digital output baseband processor; converting the one or more analog RF signals into a first digital baseband signal; converting the one or more packetized data streams into a corresponding one or more second digital baseband signals; applying one or more baseband offset frequency shifts to each of the corresponding one or more packetized data streams to generate one or more frequency offset baseband digital signals, each of the baseband frequency offsets having an offset frequency, wherein each of the baseband frequency offsets corresponds to an available carrier center frequency within the frequency band; digitally summing the first digital baseband signal and the one or more frequency offset baseband digital signals to generate a full bandwidth composite signal; and broadcasting the full bandwidth composite signal to one or more remote units.

Another aspect of the present disclosure involves a method for processing uplink signals from a plurality of remote units. The method comprises receiving an uplink digital time domain signals from each of the plurality of remote units; summing the plurality of uplink digital time domain signals to generate a composite uplink digital signal; splitting the composite uplink digital signal into a first plurality of component signals and a second plurality of component signals, wherein the first plurality of component signals correspond to a plurality of legacy base station transceivers and the second plurality of component signals correspond to a plurality of digital output baseband processors; upconverting and converting the first plurality of component signals into an analog RF (Radio Frequency) composite signal; splitting the analog RF composite signal into a plurality of constituent analog RF signals; downconverting each of the second plurality of component signals by applying a baseband offset frequency shift to each of the second plurality of component signals from its corresponding offset baseband frequency to generate a plurality of zero center frequency digital signals; converting each of the plurality of zero center frequency digital signals to a corresponding packetized data stream; transmitting each of the consituent analog RF signals to a corresponding legacy base transceiver station; and transmitting each of the packetized data streams to a corresponding digital output baseband processor.

Another aspect of the present disclosure involves a method for processing downlink signals from a plurality of base stations sharing a frequency band. The method comprises receiving a first MIMO (Multiple Input Multiple Output) layer RF signal from one or more legacy base station transceivers; receiving a second MIMO layer RF signal from the one or more legacy base station transceivers; receiving a packetized data stream from each of a plurality of digital output baseband processors; converting the first MIMO layer RF signal from the one or more legacy base station transceivers into a first MIMO layer first digital baseband signal; converting the second MIMO layer RF signal from the one or more legacy base station transceivers into a second MIMO layer first digital baseband signal; converting each of the packetized data stream into a first MIMO layer second digital baseband signal and a second MIMO layer second digital baseband signal; applying a component carrier frequency offset shift to each of the plurality of first MIMO layer second digital baseband signals to generate a plurality of offset-shifted first MIMO layer second digital baseband signals, and to each of the second MIMO layer second digital baseband signals to generate a plurality of offset-shifted second MIMO layer second digital baseband signals; digitally summing the offset-shifted first MIMO layer second digital baseband signals with the first MIMO layer first digital baseband signal to generate a first MIMO layer summed baseband signal; digitally summing the offset-shifted second MIMO layer second digital baseband signals with the second MIMO layer first digital baseband signal to generate a second MIMO layer summed baseband signal; and transmitting the first MIMO layer summed baseband signal and the second MIMO layer summed baseband signal to a plurality of remote units.

Another aspect of the present disclosure involves a method for processing uplink signals from a plurality of UEs (User Equipment), each UE corresponding to one of a plurality of operators. The method comprises receiving a first plurality of RF (Radio Frequency) signals from a first MIMO antenna of a first remote unit, the first plurality of RF signals from a first plurality of UEs; receiving a second plurality of RF signals from a second MIMO antenna of a first remote unit, the second plurality of RF signals from the first plurality of UEs; receiving a third plurality of RF signals from a first MIMO antenna of a second remote unit, the third plurality of RF signals from a second plurality of UEs; receiving a fourth plurality of RF signals from a second MIMO antenna of the second remote unit, the fourth plurality of RF signals from the second plurality of UEs; downconverting and digitizing the first plurality of signals into a first digital full bandwidth baseband signal; downconverting and digitizing the second plurality of signals into a second digital full bandwidth baseband signal; downconverting and digitizing the third plurality of signals into a third digital full bandwidth baseband signal; downconverting and digitizing the fourth plurality of signals into a fourth digital full bandwidth baseband signal; interleaving the first digital full bandwidth baseband signal and the second digital full bandwidth baseband signal into a first interleaved full bandwidth baseband signal; interleaving the third digital full bandwidth baseband signal and the fourth digital full bandwidth baseband signal into a second interleaved full bandwidth baseband signal; and transmitting the first interleaved full bandwidth baseband signal and the second interleaved full bandwidth baseband signal via a digital fronthaul connection.

Another aspect of the present disclosure involves a method for processing uplink signals from a plurality of UEs (User Equipment), each UE corresponding to one of a plurality of operators. The method comprises receiving a first interleaved full bandwidth sample stream from a first remote unit; receiving a second interleaved full bandwidth sample stream from a second remote unit; de-interleaving the first interleaved full bandwidth sample stream into a first MIMO layer first full bandwidth digital baseband signal and a second MIMO layer first full bandwidth digital baseband signal; de-interleaving the second interleaved full bandwidth sample stream into a first MIMO layer second full bandwidth digital baseband signal and a second MIMO layer second full bandwidth digital baseband signal; summing the first MIMO layer first full bandwidth digital baseband signal and the first MIMO layer second full bandwidth digital baseband signal to generate a first MIMO layer summed full bandwidth digital baseband signal; summing the second MIMO layer first full bandwidth digital baseband signal and the second MIMO layer second full bandwidth digital baseband signal to generate a second MIMO layer summed full bandwidth digital baseband signal; splitting the first MIMO layer summed full bandwidth digital baseband signal into a plurality of first MIMO layer component digital baseband signals; splitting the second MIMO layer summed full bandwidth digital baseband signal into a plurality of second MIMO layer component digital baseband signals; upconverting and converting to analog a first subset of the plurality of first MIMO layer component digital baseband signals to generate a first MIMO layer composite analog full bandwidth signal; splitting the first MIMO layer composite analog full bandwidth signal into one or more first MIMO layer individual RF signals; upconverting and converting to analog a first subset of the plurality of second MIMO layer component digital baseband signals to generate a second MIMO layer composite analog full bandwidth signal; splitting the second MIMO layer composite analog full bandwidth signal into one or more second MIMO layer individual RF signals; sending each of the one or more first MIMO layer individual RF signals and each of the one or more second MIMO layer individual RF signals to a corresponding legacy base station transceiver; performing a baseband offset frequency shift on each of the second subset of first MIMO layer component digital baseband signals and on each of the second subset of second MIMO layer component digital baseband signals to respectively generate a plurality of first MIMO layer zero center frequency component digital signals and a plurality of second MIMO layer zero center frequency component digital signals; performing digital processing on each of the first MIMO layer zero center frequency component digital signals and each of the plurality of second MIMO layer zero center frequency component digital signals to generate a plurality of mid-haul digital signal packet streams, wherein each of the plurality of mid-haul digital signal packet streams corresponds to a first MIMO layer and a second MIMO layer for a given component carrier; and transmitting each of the plurality of mid-haul digital signal packet streams to a corresponding digital output baseband processor

DESCRIPTION OF EXEMPLARY EMBODIMENTS

Figure 1:
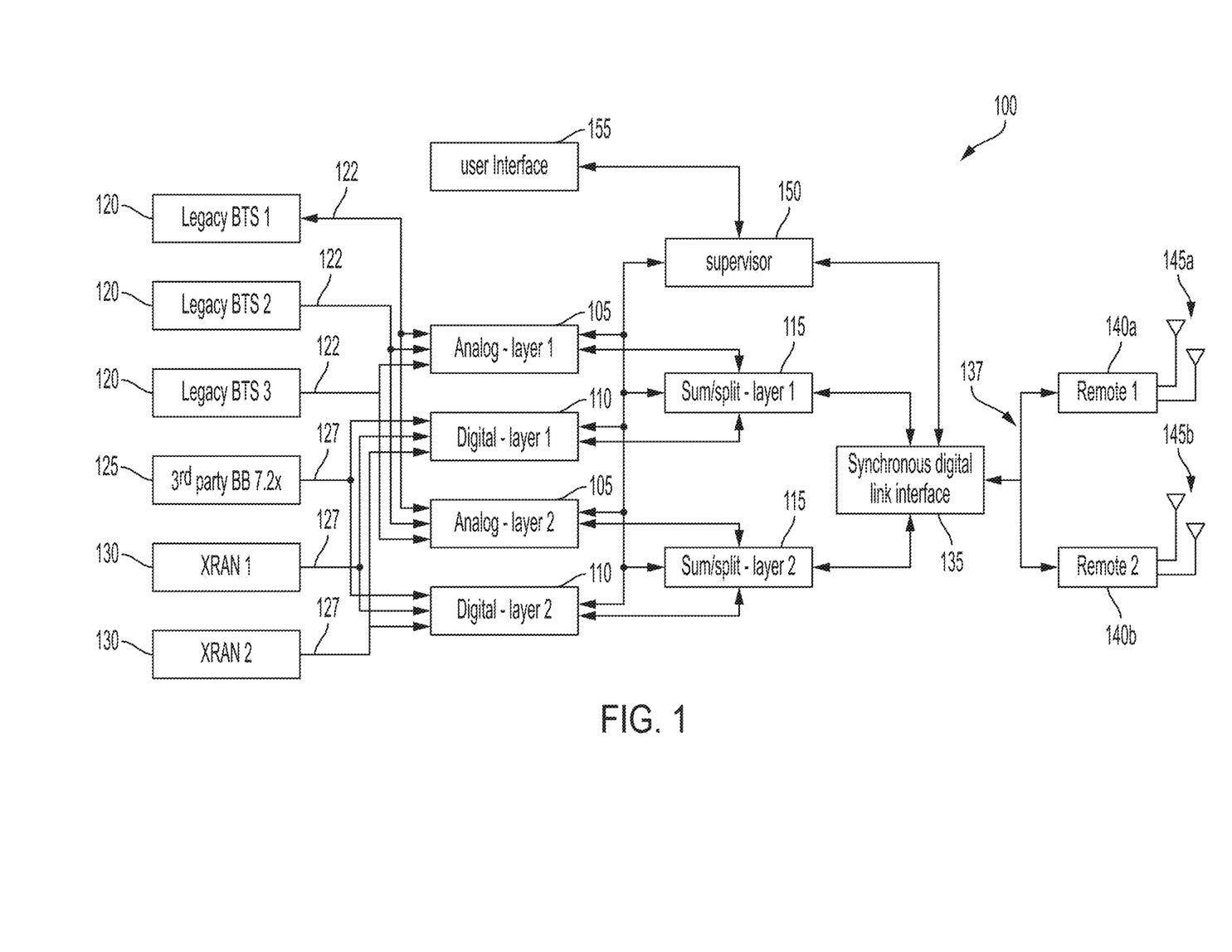
FIG. 1 illustrates an exemplary distributed radio system for providing RAN capability to multiple operators using different cellular technologies according to the disclosure.

FIG. 1 illustrates a logical diagram of exemplary distributed radio system 100 for providing RAN capability to multiple operators using different cellular technologies according to the disclosure. Exemplary system 100 provides 2×2 MIMO (Multiple Input Multiple Output) capability in a single radio frequency band, such as C-Band (3.7-3.98 GHz), or a broader bandwidth of 400 MHz.

Exemplary system 100 has two analog signal processors 105, one for MIMO layer 1 and one for MIMO layer 2. Each of the two analog signal processors 105 is coupled to three legacy BTSs (Base Transceiver Stations) 120. Each BTS 120 may correspond to a distinct mobile network operator and may employ one of a variety of cellular technologies, such as 3G, and LTE. Each legacy BTS 120 provides an RF (Radio Frequency) signal over a physical connection 122, which might otherwise be intended to be coupled to a DAS or a remote radio unit. Exemplary system 100 also may have two digital processors 110, one for MIMO layer 1 and one for MIMO layer 2. Each digital processor 110 is coupled to a $3^{rd}$ party BBU (Baseband Unit) 125, which may exchange packetized mid-haul signal data with each digital processor 110 over a connection 127, which may be a dedicated physical connection or may be a logical connection shared with other logical connections over a single Ethernet cable. It will be understood that such variations are possible and within the scope of the disclosure. The $3^{rd}$ party BBU 125 may provide packetized data corresponding to an LTE or 5G signal for a single component carrier signal. Although only one $3^{rd}$ party BBU 125 is illustrated, it will be understood that multiple $3^{rd}$ party BBUs 125 are possible, each corresponding to a different component carrier signal and each possibly corresponding to a different mobile network operator or private network, and each coupled to the illustrated digital processors 110, depending on its use of MIMO. Also coupled to each digital processor 110 is one or more XRAN virtual base stations 130 (provided by JMA Wireless), whereby each XRAN virtual base station 130 may correspond to a distinct component carrier signal and each may correspond to a distinct private network or mobile network operator. Each XRAN virtual base station 130 may exchange packetized mid-haul signal data with the two digital processors 110 over a connection 127, which may be a dedicated physical connection or may be a logical connection shared with the other XRAN virtual base stations 130 and additionally with the one or more $3^{rd}$ party BBUs 125. It will be understood that such variations are possible and within the scope of the disclosure.

XRAN virtual base station 130 and $3^{rd}$ party BBU 125 may each be an example of a digital output baseband processor. Also, the term "operator" may pertain to a given mobile network operator or private network.

Analog signal processor 105 and digital processor 110 of MIMO layer 1 are coupled to a layer 1 summer/splitter 115; and analog signal processor 105 and digital processor 110 of MIMO layer 2 are coupled to a layer 2 summer/splitter 115. Further, the layer 1 summer/splitter 115 and the layer 2 summer/splitter 115 are coupled to a synchronous digital link interface 135. The function of each of these components is described below.

Synchronous digital link interface 135 may be coupled to a plurality of remote units 140a/b over fronthaul digital connection 137, which may be a fiberoptic link or similar having a high-speed digital transmission capability such as, for example, a fiber optic link with a capacity of 25Gb/sec. Each of the radio remote units 140a and 140b may be individually coupled to one or more antennas 145a and 145b. In the illustrated example, antennas 145a/b each comprise two antennas for 2×2 MIMO operation.

Also illustrated is a supervisor module 150, which may include a user interface 155. Supervisor module 150 may obtain information from each legacy BTS 120, $3^{rd}$ party BBU 125, and XRAN virtual base station 130 pertaining to the center frequencies of their corresponding signals (e.g., respective component carriers in the case of $3^{rd}$ party BBU 125 and XRAN virtual base stations 130) and provide this information to analog signal processors 105, digital processors 110, summer/splitters 115, synchronous digital link interface 135, and remote units 140a/b for purposes described below. Alternatively, supervisor module 150 may obtain carrier center frequency information via user interface 155, in which someone configuring system 100 may input the necessary information.

Variations to system 100 are possible and within the scope of the disclosure. For example, system 100 may have only one analog signal processor 105, digital processor 110, and summer splitter 115 if MIMO is not being used. Alternatively, system 100 may have four sets of these components in case of 4×4 MIMO, etc. Further, system 100 is illustrated as having two remote units 140a/b. However, it is possible for system 100 to have only one remote unit or three or more remote units. The limit to the number of remote units deployed in system 100 may be driven by the fact that the uplink signals from each remote unit 140a/b are summed together, as described further below. Given that the signals are summed, if there are too many remote units providing signals that are summed, noise and signal variances may compound to degrade the fidelity of the resulting summed signal. Further, as mentioned above more or fewer legacy BTSs 120, $3^{rd}$ party BBUs 125, and XRAN virtual base stations 130 may be included. The limit to this may be the availability of carrier slots within the overall bandwidth of the frequency band used by system 100 (C-Band 3.7-3.98 GHz in the illustrated example, or 400 MHz is another illustrated example). It will be understood that such variations are possible and within the scope of the disclosure.

Figure 2:
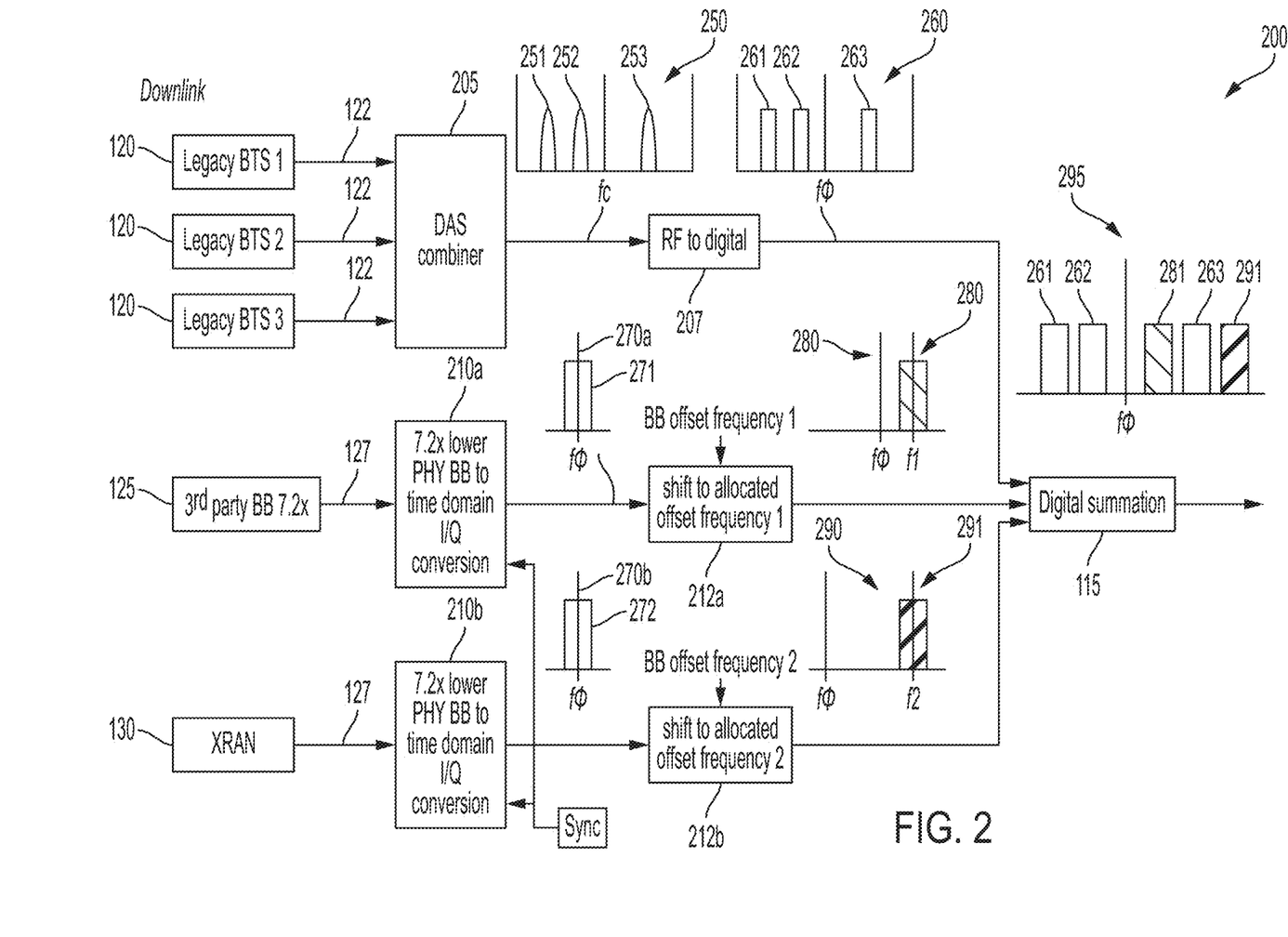
FIG. 2 illustrates a downlink portion of an exemplary distributed radio system according to the disclosure.

FIG. 2 illustrates a downlink portion 200 of system 100. Downlink portion 200 includes the analog signal processor 105, digital processor 110, and the summation functionality of summer/splitter 115 for a single given MIMO layer. Downlink portion 200 includes a DAS combiner 205 that is coupled to legacy BTSs 120; an RF to digital converter 207 that is coupled to DAS combiner 205. DAS combiner 205 and RF to digital converter 207 make up the downlink functionality of one analog signal processor 105 illustrated in FIG. 1. Downlink portion 200 further includes a plurality of 7.2× lower PHY (Physical layer) downlink processors 210a and 210b, respectively coupled to $3^{rd}$ party BBU 125 and XRAN virtual base station 130; a synchronization module 120 coupled to 7.2× lower PHY downlink processors 210a/b; a plurality of BB offset frequency shifters 212a and 212b, each coupled to its corresponding 7.2× lower PHY downlink processors 210a/b; and a digital summation functionality of summer/splitter 115 coupled to the RF to digital converter 210 and each of the BB offset frequency shifters 225. The 7.2× lower PHY layer downlink processors 210a and 210b, synchronization module 120, and BB offset frequency shifters 212a and 212b may make up the downlink functionality of one digital processor 110 illustrated of the logical diagram of system 100 in FIG. 1.

Although FIG. 2 illustrates downlink portion 200 as having distinct components for each MIMO layer, certain illustrated components may operate for both MIMO layers. For example, each 7.2× lower PHY downlink processor 210a/b may process data for both MIMO layers from a single downlink packet stream from its corresponding digital output baseband processor ($3^{rd}$ party BBU 125 or XRAN virtual base station 130). It will be understood that such variations are possible and within the scope of the disclosure.

Downlink portion 200 may operate as follows. On the analog side, DAS combiner 205 receives RF signals from each legacy BTS 120 over corresponding physical connection 122, each of which may be an RF cable. DAS combiner 205 receives the three signals (in this example) and sums them into a combined analog RF signal. Diagram 250 illustrates a frequency domain depiction of the combined analog signal, including the individual analog RF signals: signal 251 from legacy BTS 1; signal 252 from legacy BTS 2; and signal 253 from legacy BTS 3. Each signal 251/252/253 is illustrated with its corresponding frequency offset from band center frequency $f_c$. Accordingly, given that each signal 251/252/253 from respective legacy BTS 1/2/3 has a unique frequency offset from band center frequency $f_c$, the signals may be summed without interference.

The combined analog RF signal is then input to RF to digital converter 207, which digitizes and downconverts the analog RF signal into a combined digital baseband signal. The sampling rate for digitization should depend on the bandwidth of the full frequency band covered by system 100. For example, a sampling rate of 491.52 MSPS (mega samples per second) will capture the waveforms of the signals with sufficient resolution and bandwidth to fit two 400 MHz channels (one per MIMO) layer in digital fronthaul connection 137. Diagram 260 illustrates an example combined digital baseband signal, having digitized signal 261 from analog signal 251; digitized signal 262 from analog signal 252; and digitized signal 263 from analog signal 253. Each digitized signal 261/262/263 has a respective frequency offset from zero frequency $f_0$, which corresponds to their frequency offsets in composite analog signal 250. Diagram 260 depicts a baseband representation of the entire spectrum of operation for system 100 (e.g., C-Band 3.7-3.98 MHz).

On the digital side, 7.2× lower PHY downlink processor 210a receives packet data from $3^{rd}$ party BBU 125, and 7.2× lower PHY downlink processor 210b receives packet data from XRAN virtual base station 130. Both processors receive their respective packetized 7.2× data over connection 127, which may be an Ethernet connection. Each 7.2× lower PHY downlink processor 210a/b performs the requisite lower PHY layer processing to generate digital baseband time domain I/Q (In phase/Quadrature) data corresponding to the component carrier signal output of the respective $3^{rd}$ party BBU 125 or XRAN virtual base station 130.

Each 7.2× lower PHY downlink processor 210a/b may have an interpolator that takes the output of the lower PHY layer processing and interpolates the I/Q samples to reconstruct the waveform at a higher sampling rate. This is so that the sample rate matches the I/Q sample rate of the RF to digital converter 207 (e.g., 491.52 MSPS). In doing so, the interpolator brings the time domain sampling frequency from a Carrier Sampling Frequency (e.g., 15.36 MSPS, 30.72 MSPS, 122.88 MSPS, etc.) to the sampling frequency of the RF to digital converter sampling frequency of 491.52 MSPS, which is selected to enable transmission of 400 MHz bandwidth for the given MIMO layer over digital fronthaul connection 137. Further to this example, in the case of a 15.36 MSPS carrier, the interpolator interpolates by a factor of 32; in the case of a 30.72 MSPS carrier, the interpolator interpolates by a factor of 13; and in the case of a 122.88 MSPS carrier, the interpolator interpolates by a of 4. It may be the case that there are multiple digital output baseband processors (multiple $3^{rd}$ party BBUs 125 or XRAN virtual base stations 130) and each may have a different carrier sampling frequency. In this case each 7.2× lower PHY downlink processors 210a/b may use a different interpolation so that all of them have an output sampling rate of 491.52 MSPS. It will be understood that such variations are possible and within the scope of the disclosure. The interpolation is implemented on the baseband signal.

Diagram 270a illustrates the digital baseband signal 271 of $3^{rd}$ party BBU 125, centered around zero frequency $f_0$; and diagram 270b illustrates the digital baseband output 272 of XRAN virtual base station 130, centered around zero frequency $f_0$. Each of the 7.2× lower PHY downlink processors 210a/b may buffer I/Q data samples as necessary for synchronization. Further, synchronization module 220 may provide synchronization to the 7.2× lower PHY downlink processor 210a/b, either via GPS or IEEE 1588 PTP (Precision Time Protocol). In the case that PTP is used, there may be a single PTP "grandmaster" that provides synchronization signals to both 7.2× lower PHY downlink processors 215a/b, $3^{rd}$ party BBU 125, and XRAN virtual base station 130. Alternatively, a single PTP grandmaster may provide synchronization signals and may serve as a boundary clock for $3^{rd}$ party BBU 125 and XRAN virtual base station 130. In either of these examples, one of the 7.2× lower PHY downlink processors 210a/b may serve as the PTP grandmaster. It will be understood that such variations are possible and within the scope of the disclosure.

Digital baseband output 271 of 7.2× lower PHY downlink processor 210a is input to BB offset frequency shifter 212a, which shifts the frequency of the output signal 271 to a corresponding frequency offset $f_1$. The BB offset frequency $f_1$ corresponds to the component carrier frequency used by $3^{rd}$ party BBU 125, may be provided to BB offset frequency shifter 225a by supervisor module 150. Diagram 280 illustrates the digital offset baseband signal 281 output from BB offset frequency shifter 225a. The BB offset frequency $f_1$ shifts the center frequency of digital offset baseband signal 281 such that it occupies a unique portion of the baseband spectrum within the entire baseband spectrum of operation for system 100.

Supervisor module 150 may store BB offset frequency $f_1$ in a memory as a configurable parameter, or it may obtain or derive the information from the $3^{rd}$ party BBU 125 via 7.2× lower PHY downlink processor 210a. For example, 7.2× lower PHY downlink processor 210a may derive the BB offset frequency by obtaining the component carrier frequency from the O-RAN management link data received within the 7.2× data transmitted by $3^{rd}$ party BBU 125 over connection 127. Either way, supervisor module 150 may maintain the value for BB offset frequency $f_1$ so that supervisor module 150 may coordinate the offset frequencies of each of the incoming signals to assure that no two signals share the same offset frequency and thus interfere with each other. The BB offset frequency $f_1$ is also needed for subsequent downconversion of the uplink signal, which is described below.

Similarly, digital baseband output 272 of 7.2× lower PHY downlink processor 210b is input to BB offset frequency shifter 212b, which shifts the frequency of the output signal 272 to a corresponding frequency offset $f_2$. The BB offset frequency $f_2$ may be provided to BB offset frequency shifter 212b by supervisor module 150 or may be derive from the 7.2× packet data as described above. Supervisor module 150 may maintain the value for BB offset frequency $f_2$ so that it may coordinate the offset frequencies of each of the incoming signals so that no two signals share the same offset frequency and thus interfere with each other, and so that it can downconvert the incoming uplink signals as described below. Diagram 290 illustrates the digital offset baseband signal 291 output from BB offset frequency shifter 225b. The BB offset frequency $f_2$ shift of the center frequency of digital offset baseband signal 291 assures that it occupies a unique portion of the baseband spectrum within the entire baseband spectrum of operation for system 100.

The combined digital baseband signal output from RF to digital converter 210 (depicted in diagram 260), the digital offset baseband signal 281 output from BB offset frequency shifter 212a, and the digital offset baseband signal 291 output from BB offset frequency shifter 212b are each input to digital summation function within summer/splitter 115. The digital summation function does the following: it sums the three time domain signals into a single merged full bandwidth digital signal, represented in frequency domain form in diagram 295. Diagram 295 depicts a full bandwidth combined BB digital signal, which is the digital summation of all of the signals, including digitized signal 261 from legacy BTS 1; digitized signal 262 from legacy BTS 2; and digitized signal 263 from legacy BTS 3, digital offset baseband signal 281 from $3^{rd}$ party BBU 125, and digital offset baseband signal 291 from XRAN virtual base station 130.

The above description of downlink portion 200 pertains to a single combination of analog signal processor 105, digital 7.2× processor 110, and a summer/splitter 115 summation function, for a MIMO layer. Returning to FIG. 1, the summer/splitter 115 of layer 1 and the summer/splitter 115 of layer 2 each output a full bandwidth combined BB digital signal 295. These signals are respectively input to synchronous digital link interface 135.

Synchronous digital link interface 135 receives two full bandwidth combined BB digital signal 295s, corresponding to MIMO layer 1 and MIMO layer 2. The following description is for use of a full bandwidth of 400 MHz. Synchronous digital link interface 135 interleaves the two re-sampled MIMO layer full bandwidth combined BB digital signals on a I/Q sample-by-sample basis and maps the interleaved I/Q sample streams into a modified CPRI stream. For example, CPRI stream I/Q sample 0 is assigned to the first I/Q sample from MIMO layer 1, I/Q sample 1 is assigned the first I/Q sample from MIMO layer 2, I/Q sample three is assigned to the second I/Q sample from MIMO layer 1, etc. Doing so may make optimal use of the 25Gb/see data rate of the fronthaul digital connection 137 while minimizing latency for the two signals. One will note that this is an unconventional use of the CPRI standard, although synchronous digital link interface 135 makes the following use of the CPRI standard: first, it interleaves the two full bandwidth combined BB digital signals 295 into a single CPRI data path; second, it populates the fast control channel with management information (e.g., sample rate, center frequency $f_e$, number of antenna streams, queries for status or alarms, and configuration commands), which uses Ethernet over CPRI; and third, it populates some of the vendor-specific data fields with "low speed" information such as configuration information for remotes 140a and 140b. Examples of management information include sample rate, center frequency $f_e$, number of antenna streams, queries for status or alarms, and configuration commands.

Variations to synchronous digital link interface 135 and fronthaul digital connection 137 are possible. For example, instead of using a modified version of CPRI, modified versions of eCPRI, IEEE1914, or a custom implemented fast synchronous interface may be used. For any of these alternatives, there may be limitations to the bandwidth and latency on the capacity of digital fronthaul connection 137.

It may be necessary to apply compression to each of the two 400 MHz re-sampled full bandwidth combined BB digital signals (one per MIMO layer) to have them fit into fronthaul digital connection 137 capacity. In an example approach, each of the two 400 MHz re-sampled full bandwidth combined BB signals is sampled at 12-bit resolution. Sufficient compression may be achieved by discarding the least significant bit of every second I/Q sample. In this case, each signal has I/Q samples that alternate between 11-bit and 12-bit resolution, which provides sufficient precision to properly reconstruct the signal while enabling transmission of two 400 MHz signals over a 25 Gb/see fiber optic link.

As mentioned above, synchronous digital link interface 135 constructs a CPRI stream with a data path containing the interleaved compressed full bandwidth BB signals with the management information in the fast channel and vendor-specific information into a constructed CPRI data stream and transmits the constructed CPRI data stream using a fiber optic interface (OTRX). In doing so, OTRX may have the infrastructure to transmit an identical signal to both remote units 140a/b. It may do so by directing the CPRI data stream to one or more remote units 140a/b as described in CPRI Specification v.7.0 Section 2.3. By broadcasting the same signal to both remote units 140a/b, better coverage of a given area may be achieved, in accordance with the operation of a Distributed Antenna System. Although two remote units 140a/b are illustrated, it will be understood that more than two remote units 140a/b may be configured to receive the broadcast signal from Synchronous digital link interface 135 and transmit it through its antennas.

Each of the remote units 140a/b receives the constructed CPRI data stream over fronthaul digital connection 137. Remote units 140a/b each de-interleave the two MIMO layer I/Q sample streams, thereby reconstructing a compressed version of the two individual full bandwidth combined BB digital signals 295, one per MIMO layer. Each remote unit 140a/b then converts the two full bandwidth combined BB digital signals 295 from digital to analog and upconverts the analog signals such that the zero frequency $f_0$ depicted in diagram 295 is shifted to the center frequency $f_c$ of the operating frequency band. In doing so, remote units 140a/b may apply Crest Factor Reduction and digital pre-distortion to the digital I/Q data before upconverting the signal to center frequency $f_c$. Each of the remote units 140a/b then amplifies the full bandwidth upconverted RF signals and transmits them out its antennas 140a/b. For example, remote unit 140a transmits each of its MIMO layer signals through a corresponding one of the two illustrated antennas 145a, and remote unit 140b transmits each of its MIMO layer signals through a corresponding one of the two illustrated antennas 145b.

Figure 3:
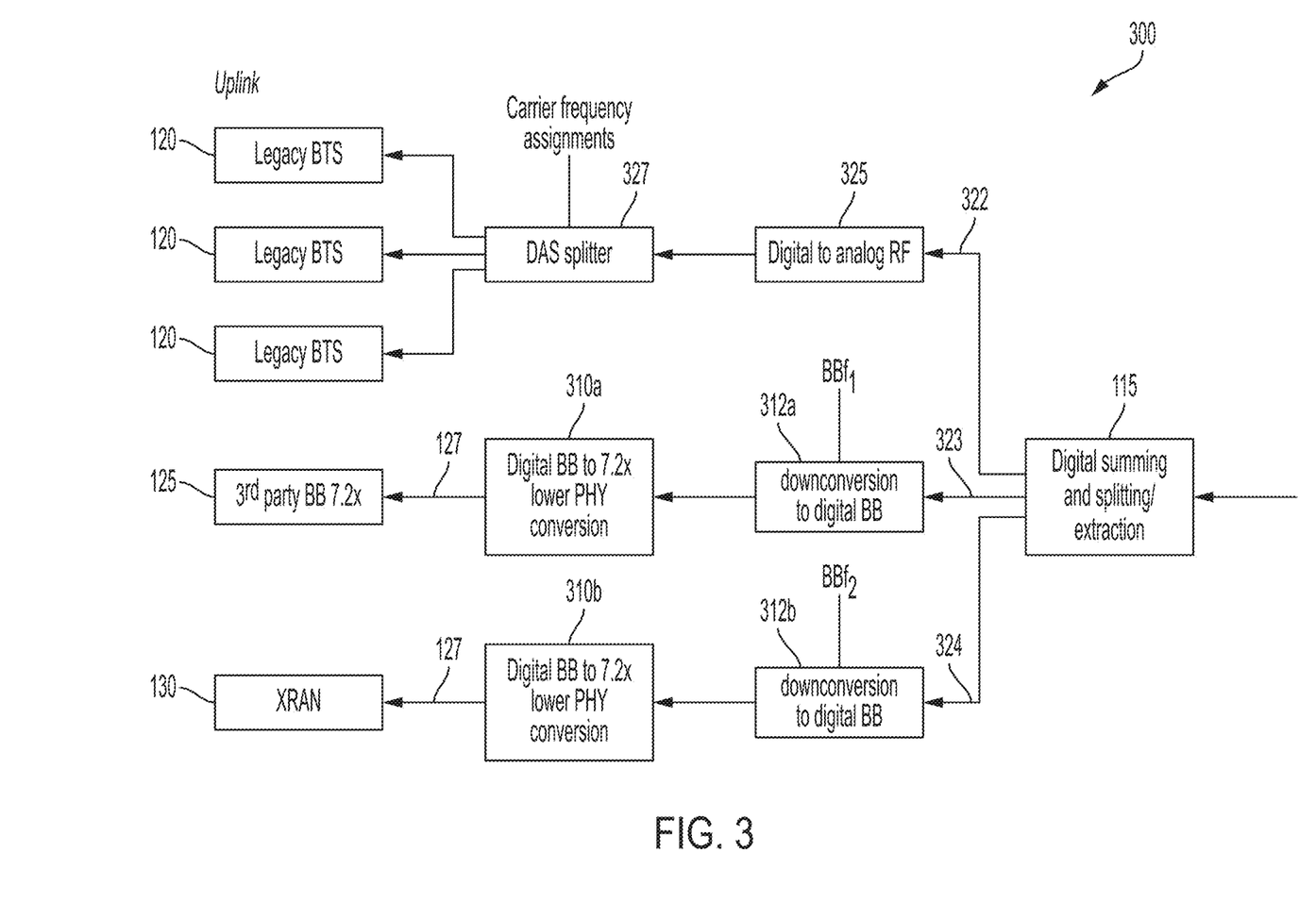
FIG. 3 illustrates an uplink portion of an exemplary distributed radio system according to the disclosure.

FIG. 3 illustrates an uplink portion 300 of exemplary system 100. Uplink portion 300 encompasses the uplink functionality of one MIMO layer, including a given analog signal processor 105 (components 325 and 317) and a digital processor 110 (components 312a/b and 310a/b), along with corresponding summer/splitter 115 illustrated in FIG. 1. Uplink portion 300 comprises the digital summer/splitter/ extractor functionality of summer/splitter 115 (hereinafter "splitter/extractor 115"), the output of which is coupled to a digital to analog RF converter 325 and two digital down-converters 312a/b. Digital downconverter 312a is also coupled to a digital BB to 7.2× lower PHY processor 310a corresponding to $3^{rd}$ party BBU 125. Digital downconverter 312b is further coupled to a digital BB to 7.2× lower PHY processor 310b corresponding to XRAN virtual base station 130.

Although FIG. 3 illustrates uplink portion 300 as having distinct components for each MIMO layer, certain illustrated components may operate for both MIMO layers. For example, each 7.2× lower PHY processor 310a/b may process data for both MIMO layers, thereby taking two separate MIMO layer signals as input and outputting a single packet stream to send to its corresponding digital output baseband processor ($3^{rd}$ party BBU 125 or XRAN virtual base station 130).

DAS splitter 327 is coupled to each of the legacy BTSs 120; digital BB to 7.2× lower PHY processor 310a is coupled to a corresponding $3^{rd}$ party BBU 125; and digital BB to 7.2× lower PHY processor 310b is coupled to XRAN virtual base station 130.

Uplink portion 300 of system 100 may operate as follows. Remote unit 140a receives an RF signal from each of its two MIMO antennas 145a. The received signals may be from a plurality of UEs (User Equipment), such as mobile phones and devices, each of which are operating through one of the network operators or private networks corresponding to one of the legacy BTSs 120, the $3^{rd}$ party BBU 130, and the XRAN virtual base station 130. Remote unit 140a amplifies each of the received signals, digitizes them, and downconverts them into digital baseband format. In the reverse of the process implemented by synchronous digital link interface 135 described above, remote unit 140a compresses both digital baseband signals and interleaves them into a single sample stream that it then maps into a CPRI data stream. Remote unit 140a then transmits the CPRI data stream via digital fronthaul connection 137 to synchronous digital link interface 135. Similarly, remote unit 140b receives an RF signal from each of its two MIMO antennas 145b, amplifies each of the received signals, digitizes them, and downconverts them into digital baseband format. In the reverse of the process implemented by synchronous digital link interface 135 described above for the downlink, remote unit 140b compresses both digital baseband signals and interleaves them into a single sample stream that it then maps into a CPRI data stream. Remote unit 140b then transmits the CPRI data stream via digital fronthaul connection 137 to synchronous digital link interface 135.

Accordingly, synchronous digital link interface 135 receives two streams of CPRI data: one from remote unit 140a and the other from remote unit 104b.

Splitter/extractor 115 (functionality within synchronous digital link interface 135) de-interleaves both received signals to derive a full bandwidth digital baseband signal for each MIMO layer for remote 140a and remote 140b (four signals in total), sums the two MIMO layer 1 signals from remotes 104a/b, and sums the two MIMO layer 2 signals from remotes 140a/b, thereby generating a summed MIMO layer 1 full bandwidth signal and a summed MIMO layer 2 full bandwidth signal. Splitter/extractor 115 then filters each of the summed MIMO layer full bandwidth signals into each of their respective carrier frequencies provided by supervisor module 150. In doing so, splitter/extractor 115 splits and extracts each constituent digital BB signal 261/262/263/281/291 as depicted in diagram 295 in FIG. 2 for each MIMO layer. This is done using the carrier frequencies provided by supervisor module 150 for filtering and extracting the respective signals. In extracting each signal, for each MIMO layer, splitter/extractor 115 transmits the following signals to the following destinations: digital BB signals 261/262/263 corresponding to the legacy BTSs 120 to digital to analog RF converter 325; digital BB signal 281 to digital downconverter 312a; and digital BB signal 291 to digital downconverter 312b 324.

Digital to analog RF converter 325 converts the composite BB signal containing digital signals 261/262/263 to an analog signal and upconverts it to the appropriate RF band centered at center frequency $f_c$, which is provided by supervisor module 150. The output of digital to analog converter 325 is an analog RF signal similar to that depicted in diagram 250 in FIG. 2. This analog RF signal is then input to DAS splitter 327, which breaks out its constituent analog RF signals 251/252/253 into individual signals and transmits them to their respective legacy BTSs 120 over respective connections 122.

Digital downconverter 312a receives digital BB signal 281 from digital splitter/extractor 115 and downconverts it from its existing center frequency offset $f_1$ so that it is centered around zero frequency $f_0$. Digital downconverter 312a then transmits the zero frequency BB signal to its corresponding digital BB lower PHY processor 310a. Similarly, digital downconverter 312b receives digital BB signal 291 from digital splitter/extractor 115 and downconverts it from its existing center frequency offset $f_2$ so that it is centered around zero frequency $f_0$. Digital downconverter 312b then transmits the zero frequency BB signal to its corresponding digital BB lower PHY processor 310b.

Digital BB to 7.2× lower PHY processor 310a performs uplink lower PHY layer processing according to the O-RAN and 3GPP specifications (as appropriate), packetizes the resulting data and transmits it to $3^{rd}$ party BBU 125 over connection 127. Similarly, digital BB to 7.2× lower PHY processor 310b performs uplink lower PHY layer processing according to the O-RAN and 3GPP specifications (as appropriate), packetizes the resulting data and transmits it to XRAN virtual base station 130 over connection 127. Each digital BB to 7.2× lower PHY processor 310 may have a decimator, which receives the digital baseband signal 271/272, which has a sampling frequency designed to take full advantage of the bandwidth capacity of digital fronthaul connection 137 (e.g., 491.52 MSPS) and decimates the signal to reduce the sampling frequency to match the carrier sampling frequency of the corresponding carrier (e.g., 15.36 MSPS, 30.72 MSPS, 122.88 MSPS, etc), in essentially the reverse of the interpolation process described above.

Although FIGS. 2 and 3 only illustrate one XRAN virtual base station 130, whereas FIG. 1 illustrates two, it will be understood that downlink portion 200 and uplink portion 300 may have more XRAN virtual base stations 130 than that illustrated, and that only one is depicted for convenience of illustration.

All of the modules depicted in downlink portion 200 and uplink portion 300 may be implemented as machine readable instructions that are encoded within one or more non-transitory memory devices and executed on one or more processors that perform their respective described functions. As used herein, "non-transitory memory" may refer to any tangible storage medium (as opposed to an electromagnetic or optical signal) and refers to the medium itself, and not to a limitation on data storage (e.g., RAM vs. ROM). For example, non-transitory medium may refer to an embedded volatile memory encoded with instructions whereby the memory may have to be re-loaded with the appropriate machine-readable instructions after being power cycled.

Variations to the above exemplary embodiments are possible and within the scope of the disclosure. For example, in addition to having legacy BTSs coupled to system 100 over analog RF physical connections and $3^{rd}$ party BBUs and XRAN virtual base stations coupled to the system 100, system 100 may include other BTSs or BBUs coupled via CPRI or eCPRI. In this case, system 100 may further include a termination module, similar to the digital 7.2× processor 110, that performs the required functions for formatting and packetizing. Further, other baseband splits may be used, either in place of or in addition to the O-RAN 7.2× split, such as Split 8. This could include baseband splits for different protocols, such as 2G or 3G as well.

What is claimed is:

1. A method for processing downlink signals from a plurality of base stations sharing a frequency band, comprising:
   receiving one or more analog Radio Frequency (RF) signals, each from a corresponding one or more legacy base station transceivers;
   receiving one or more packetized data streams, each packetized data stream corresponding to a digital output baseband processor;
   converting the one or more analog RF signals into a first digital baseband signal;
   converting the one or more packetized data streams into a corresponding one or more second digital baseband signals;
   applying one or more baseband frequency offset shifts to each of the corresponding one or more second digital baseband signals to generate one or more frequency offset baseband digital signals, each of the baseband frequency offsets having an offset frequency, wherein each of the baseband frequency offsets corresponds to an available carrier center frequency within the frequency band;
   digitally summing the first digital baseband signal and the one or more frequency offset baseband digital signals to generate a composite signal; and broadcasting the composite signal to one or more remote units.

2. The method of claim 1, wherein the converting the one or more analog RF signals into a first digital baseband signal comprises sampling a combined RF signal at a first sampling rate, wherein the first sampling rate corresponds to a maximum capacity of a digital fronthaul connection.

3. The method of claim 2, wherein the converting the one or more packetized data streams into a corresponding one or more second digital baseband signals comprises interpolating a carrier sample frequency digital baseband signal to generate a digital baseband signal having the first sampling rate.

4. The method of claim 1, wherein the composite signal is a full bandwidth composite signal.

5. A method for processing uplink signals from a plurality of remote units, comprising:
    receiving an uplink digital time domain signal from each of the plurality of remote units;
    summing the plurality of uplink digital time domain signals to generate a composite uplink digital signal;
    splitting the composite uplink digital signal into a first plurality of component signals and a second plurality of component signals, wherein the first plurality of component signals correspond to a plurality of legacy base station transceivers and the second plurality of component signals correspond to a plurality of digital output baseband processors;
    upconverting and converting the first plurality of component signals into an analog RF (Radio Frequency) composite signal;
    splitting the analog RF composite signal into a plurality of constituent analog RF signals;
    downconverting each of the second plurality of component signals by applying a baseband frequency offset shift to each of the second plurality of component signals from its corresponding offset baseband frequency to generate a plurality of zero center frequency digital signals;
    converting each of the plurality of zero center frequency digital signals to a corresponding packetized data stream;
    transmitting each of the consituent analog RF signals to a corresponding legacy base transceiver station; and
    transmitting each of the packetized data streams to a corresponding digital output baseband processor.

6. The method of claim 5, wherein the converting each of the plurality of zero center frequency digital signals to a corresponding packetized data stream comprises decimating each of the plurality of zero center frequency digital signals from a first sampling frequency to a carrier sampling frequency.

7. A method for processing downlink signals from a plurality of base stations sharing a frequency band, comprising:
    receiving a first MIMO (Multiple Input Multiple Output) layer RF (Radio Frequency) signal from one or more legacy base station transceivers;
    receiving a second MIMO layer RF signal from the one or more legacy base station transceivers;
    receiving a packetized data stream from each of a plurality of digital output baseband processors;
    converting the first MIMO layer RF signal from the one or legacy base station transceivers into a first MIMO layer first digital baseband signal;
    converting the second MIMO layer RF signal from the one or more legacy base station transceivers into a second MIMO layer first digital baseband signal;
    converting each of the packetized data streams into a first MIMO layer second digital baseband signal and a second MIMO layer second digital baseband signal;
    applying a component carrier frequency offset shift to each of the plurality of first MIMO layer second digital baseband signals to generate a plurality of offset-shifted first MIMO layer second digital baseband signals, and to each of the second MIMO layer second digital baseband signals to generate a plurality of offset-shifted second MIMO layer second digital baseband signals;
    digitally summing the offset-shifted first MIMO layer second digital baseband signals with the first MIMO layer first digital baseband signal to generate a first MIMO layer summed baseband signal;
    digitally summing the offset-shifted second MIMO layer second digital baseband signals and the second MIMO layer first digital baseband signal to generate a second MIMO layer summed baseband signal; and
    transmitting the first MIMO layer summed baseband signal and the second MIMO layer summed baseband signal to a plurality of remote units.

8. The method of claim 7, wherein the converting the first MIMO layer RF signal from the one or more legacy base station transceivers into a first MIMO layer first digital baseband signal comprises sampling the first MIMO layer RF signal at a first sampling rate, wherein the first sampling rate corresponds to a maximum capacity of a digital fronthaul connection.

9. The method of claim 8, wherein the converting each of the packetized data streams into a first MIMO layer second digital baseband signal and a second MIMO layer second digital baseband signal comprises interpolating the first MIMO layer second digital baseband signal and the second MIMO layer second digital baseband signal so that the first MIMO layer second digital baseband signal and a second MIMO layer second digital baseband signal each comprises the first sampling rate.

10. The method of claim 7, wherein the transmitting the first MIMO layer summed baseband signal and the second MIMO layer summed baseband signal to a plurality of remote units comprises interleaving the first MIMO layer summed baseband signal with the second MIMO layer summed baseband signal.

11. The method of claim 10, wherein the interleaving comprises interleaving the first MIMO layer summed baseband signal with the second MIMO layer summed baseband signal on a sample-by-sample basis.

12. The method of claim 10, wherein the transmitting further comprises compressing the first MIMO layer summed baseband signal and the second MIMO layer summed baseband signal.

13. The method of claim 12, wherein the compressing comprises discarding a least significant bit from every second sample.

14. The method of claim 7, wherein the transmitting the first MIMO layer summed baseband signal and the second MIMO layer summed baseband signal to a plurality of remote units comprises mapping the first MIMO layer summed baseband signal and the second MIMO layer summed baseband signal into a single CPRI (Common Public Radio Interface) data path.

15. The method of claim 7, wherein the converting the first MIMO layer packetized data stream from the plurality of digital output baseband processors into a first MIMO layer second digital baseband signal comprises performing lower PHY (physical) layer 7.2x processing.

16. The method of claim 7, wherein the converting the second MIMO layer packetized data stream from the plurality of digital output baseband processors into a first MIMO layer second digital baseband signal comprises performing lower PHY (physical) layer 7.2x processing.

17. The method of claim 7, wherein the first MIMO layer summed baseband signal and the second MIMO layer summed baseband signal each comprise a bandwidth of 400 MHz.

18. The method of claim 7, wherein the first MIMO layer summed baseband signal and the second MIMO layer summed baseband signal each comprise a bandwidth of 280 MHz.

19. A method for processing uplink signals from a plurality of UEs (User Equipment), each UE corresponding to one of a plurality of operators, the method comprising:
receiving a first plurality of RF (Radio Frequency) signals from a first MIMO antenna of a first remote unit, wherein the first plurality of RF signals are from a first plurality of UEs;
receiving a second plurality of RF signals from a second MIMO antenna of a first remote unit, wherein the second plurality of RF signals are from the first plurality of UEs;
receiving a third plurality of RF signals from a first MIMO antenna of a second remote unit, wherein the third plurality of RF signals are from a second plurality of UEs;
receiving a fourth plurality of RF signals from a second MIMO antenna of the second remote unit, wherein the fourth plurality of RF signals are from the second plurality of UEs;
downconverting and digitizing the first plurality of signals into a first digital baseband signal;
downconverting and digitizing the second plurality of signals into a second digital baseband signal;
downconverting and digitizing the third plurality of signals into a third digital baseband signal;
downconverting and digitizing the fourth plurality of signals into a fourth digital baseband signal;
interleaving the first digital baseband signal and the second digital baseband signal into a first interleaved baseband signal;
interleaving the third digital baseband signal and the fourth digital baseband signal into a second interleaved baseband signal; and
transmitting the first interleaved baseband signal and the second interleaved baseband signal via a digital fronthaul connection.

20. The method of claim 19, wherein interleaving the first digital baseband signal and the second digital baseband signal into a first interleaved baseband signal comprises:
compressing the first digital baseband signal; and
compressing the second digital baseband signal.

21. The method of claim 19, wherein the compressing the first digital baseband signal comprises discarding a least significant bit of every second I/Q sample.

22. The method of claim 19, wherein interleaving the first digital baseband signal and the second digital baseband signal into a first interleaved baseband signal comprises interleaving the first digital baseband signal and the second digital baseband signal on a sample-by-sample basis.

23. The method of claim 19, wherein the first digital baseband signal, the second digital baseband signal, the third digital baseband signal, and the fourth digital baseband signal are each full bandwidth digital baseband signals.

24. A method for processing uplink signals from a plurality of UEs (User Equipment), each UE corresponding to one of a plurality of operators, the method comprising:
receiving a first interleaved sample stream from a first remote unit;
receiving a second interleaved sample stream from a second remote unit;
de-interleaving the first interleaved sample stream into a first MIMO layer first digital baseband signal and a second MIMO layer first digital baseband signal;
de-interleaving the second interleaved sample stream into a first MIMO layer second digital baseband signal and a second MIMO layer second digital baseband signal;
summing the first MIMO layer first digital baseband signal and the first MIMO layer second digital baseband signal to generate a first MIMO layer summed full baseband signal;
summing the second MIMO layer first digital baseband signal and the second MIMO layer second digital baseband signal to generate a second MIMO layer summed digital baseband signal;
splitting the first MIMO layer summed digital baseband signal into a plurality of first MIMO layer component digital baseband signals;
splitting the second MIMO layer summed digital baseband signal into a plurality of second MIMO layer component digital baseband signals;
upconverting and converting to analog a first subset of the plurality of first MIMO layer component digital baseband signals to generate a first MIMO layer composite analog signal;
splitting the first MIMO layer composite analog signal into one or more first MIMO layer individual RF signals;
upconverting and converting to analog a first subset of the plurality of second MIMO layer component digital baseband signals to generate a second MIMO layer composite analog signal;
splitting the second MIMO layer composite analog signal into one or more second MIMO layer individual RF signals;
transmitting each of the one or more first MIMO layer individual RF signals and each of the one or more second MIMO layer individual RF signals to a corresponding legacy base station transceiver;
performing a baseband frequency offset shift on each of the second subset of first MIMO layer component digital baseband signals and on each of the second subset of second MIMO layer component digital baseband signals to respectively generate a plurality of first MIMO layer zero center frequency component digital signals and a plurality of second MIMO layer zero center frequency component digital signals;
performing digital processing on each of the first MIMO layer zero center frequency component digital signals and each of the plurality of second MIMO layer zero center frequency component digital signals to generate a plurality of mid-haul digital signal packet streams, wherein each of the plurality of mid-haul digital signal packet streams corresponds to a first MIMO layer and a second MIMO layer for a given component carrier; and
transmitting each of the plurality of mid-haul digital signal packet streams to a corresponding digital output baseband processor.

25. The method of claim 24, wherein the performing digital processing on each of the first MIMO layer zero center frequency component digital signals and each of the plurality of second MIMO layer zero center frequency component digital signals comprises decimating each of the first MIMO layer zero center frequency component digital signals and each of the plurality of second MIMO layer zero center frequency component digital signals so that each of the first MIMO layer zero center frequency component digital signals and each of the plurality of second MIMO layer zero center frequency component digital signals has a sampling rate corresponding to its carrier sampling frequency.

26. The method of claim 24, wherein the performing digital processing on each of a second subset of the plurality of first MIMO layer component digital baseband signals and second MIMO layer component digital baseband signals comprises:
- performing low PHY (Physical) layer 7.2× digital processing on each of a second subset of the plurality of first MIMO layer component digital baseband signals and second MIMO layer component digital baseband signals; and
- packetizing each of a second subset of the plurality of first MIMO layer component digital baseband signals and second MIMO layer component digital baseband signals.

27. The method of claim 24, wherein the first interleaved sample stream and the second interleaved sample stream are full bandwidth sample streams.

* * * * *